US009645233B2

(12) United States Patent
Hintz

(10) Patent No.: US 9,645,233 B2
(45) Date of Patent: May 9, 2017

(54) CAVITY LENGTH DETERMINATION APPARATUS

(71) Applicant: Kenneth J Hintz, Fairfax Station, VA (US)

(72) Inventor: Kenneth J Hintz, Fairfax Station, VA (US)

( * ) Notice: Subject to any disclaimer, the term of this patent is extended or adjusted under 35 U.S.C. 154(b) by 775 days.

(21) Appl. No.: 14/068,165

(22) Filed: Oct. 31, 2013

(65) Prior Publication Data

US 2016/0223660 A1    Aug. 4, 2016

Related U.S. Application Data

(63) Continuation of application No. 12/910,504, filed on Oct. 22, 2010, now Pat. No. 8,599,061.

(60) Provisional application No. 61/314,638, filed on Mar. 17, 2010.

(51) Int. Cl.
| | |
|---|---|
| *G01S 13/34* | (2006.01) |
| *F41G 3/14* | (2006.01) |
| *G01S 13/88* | (2006.01) |
| *G01S 5/02* | (2010.01) |

(52) U.S. Cl.
CPC .......... *G01S 13/347* (2013.01); *F41G 3/147* (2013.01); *G01S 5/0278* (2013.01); *G01S 13/88* (2013.01)

(58) Field of Classification Search
CPC ....... G01S 13/347; G01S 5/0278; F41G 3/147
USPC .................... 342/196, 90, 192, 193
See application file for complete search history.

(56) References Cited

U.S. PATENT DOCUMENTS

| | | | | |
|---|---|---|---|---|
| 6,359,582 B1* | 3/2002 | MacAleese | ............. | G01S 7/417 342/192 |
| 6,967,614 B1* | 11/2005 | Wardell | ................. | F42C 15/40 342/13 |
| 7,492,303 B1* | 2/2009 | Levitan | ................... | G01S 7/024 342/188 |
| 8,049,659 B1* | 11/2011 | Sullivan | ................... | F41G 3/14 342/90 |
| 8,599,061 B2* | 12/2013 | Hintz | .................... | G01S 13/347 342/192 |
| 8,939,367 B2* | 1/2015 | Hintz | ....................... | F41G 3/08 235/404 |
| 2009/0058710 A1* | 3/2009 | Levitan | .................. | G01S 7/024 342/22 |
| 2012/0075958 A1* | 3/2012 | Hintz | .................... | G01S 13/347 367/125 |

(Continued)

OTHER PUBLICATIONS

J. T. Miller, T. H. Bell, J. Soukup and D. Keiswetter, "Simple phenomenological models for wideband frequency-domain electromagnetic induction," in IEEE Transactions on Geoscience and Remote Sensing, vol. 39, No. 6, pp. 1294-1298, Jun. 2001.*

*Primary Examiner* — John B Sotomayor

(57) ABSTRACT

Embodiments include an apparatus comprising a frequency selective electromagnetic receiver and a signal analyzing module. The frequency selective electromagnetic receiver is configured to receive a reradiating electromagnetic signal resulting from a cavity induced modulation phenomenon occurring within cavit(ies). The signal analyzing module is configured to: determine a power spectral density of the reradiating electromagnetic signal. Frequencies are observed at which the amplitude modulation of the power spectral density peaks. A cavity length is determined employing the frequencies of the power spectral density peaks.

20 Claims, 8 Drawing Sheets

(56) References Cited

U.S. PATENT DOCUMENTS

2014/0203080 A1* 7/2014 Hintz .................. F41G 3/08
   235/404
2016/0223660 A1* 8/2016 Hintz .................. G01S 13/347
   342/196

* cited by examiner

CAVITY LENGTH DETERMINATION APPARATUS

CROSS-REFERENCE TO RELATED APPLICATIONS

This application is a continuation of U.S. application Ser. No. 12/910,504, filed Oct. 22, 2010, which claims the benefit of U.S. Provisional Application No. 61/314,638, filed Mar. 17, 2010, which are hereby incorporated by reference in their entirety.

STATEMENT REGARDING FEDERALLY SPONSORED RESEARCH OR DEVELOPMENT

This invention was made with government support under Grant Number N00014-09-1-0063 awarded by the United States Office of Navel Research (ONR). The government has certain rights in the invention.

BACKGROUND

Historically, snipers are a persistent military and security problem. Current snipers are becoming more lethal at longer ranges due to increased training and improved equipment. The increased engagement range reduces the probability of detection and generally allows a sniper to inflict a casualty before he is detection. This single shot casualty of a high-value target is often sufficient to achieve the sniper's objective and there is often no intent to fire a second round.

There are various technologies available for detecting a sniper after a first shot is fired and detecting the source of incoming mortar rounds or other ballistic projectiles. One method is to detect the projectile in-flight, be it a sniper bullet or a mortar round, and track its ballistic trajectory in flight. From a series of measurements of a projectile's location while it is in ballistic flight, the location of the weapon from which it originated can be estimated. Alternatively, the projectile's trajectory can be estimated from acoustic signals associated with the movement of the projectile in air again allowing one to compute the location of the weapon from which the projectile originated.

Methods for detecting and tracking projectiles utilize optical, microwave radar, and acoustic methods. However, independent of the detection and tracking modality, these methodologies require that a projectile be fired by an adversary before the detection can occur.

There are also several less well known methods for detecting a sniper before he shoots. Physical Optics Corporation (POC) of Torrance, Calif. proposed in 2007 to develop a new Pre-shot Sniper Detection (PSD) system that identifies covert snipers before they shoot, even in cluttered urban environments, in less than 2 to 3 seconds. The PSD system is based on a multimodal, high-resolution, imaging optics package with no moving parts and processing hardware that accurately detects snipers. Argon Engineering of Fairfax, Va. advertises an optical pre-shot sniper detection system with no specifications listed. Torrey Pines Logic, Inc. of San Diego, Calif. sells an optical retro-reflection system (pre-shot sniper detection), the Mirage 1200™ Beam 50. US patent application No. 2008/0259320A1, dated Oct. 23, 2008, entitled "Apparatus and Method for Detecting Optical Systems in a Terrain" discloses an apparatus that utilizes an active laser (light) illuminator of terrain and analysis of the returned signal to detect the presence of sighting optics associated with a sniper.

There remains an urgent and unsatisfied need for non-optical based pre-shot sniper detection as demonstrated by the advanced planning briefing for Industry presented 26 Jan. 2010 by the Combating Terrorism Technical Support Office.

There is also a need for effective pre-engagement detection of snipers because a single shot casualty of a high-value target is often sufficient to achieve the sniper's objective and there is often no intent to fire a second round. Pre-engagement detection of snipers provides a proactive ability to eliminate or significantly reduce the threat of snipers by notifying the potential victim of the presence and location of a sniper before the sniper shoots. However, each of the technologies discussed above has deficiencies in achieving reliable pre-shot sniper detection. Each of the discussed technologies either suffer from optical limitations or temporal limitations. What is needed is a technology capable of detecting a sniper's weapon before a shot is fired without optical limitations.

DETAILED DESCRIPTION OF EMBODIMENTS

Embodiments of the present invention detect object cavities. Some embodiments may be configured to detect a sniper before he fires his weapon. Additional embodiments may be used to detect other barreled weapons. Embodiments may be configured to detect numerous other objects with cavities including many non-military applications such as exhaust pipes, jet engines, cavity defects in surfaces, etc.

Since many sniper weapons contain cavities, embodiments of the present invention may be utilized to detect snipers before they shoot. Embodiments may also detect other objects which contain cavities. An underlying phenomenology is a measurable frequency-dependent modulation of a signal that occurs as a result of the interaction of an irradiating signal with a cavity. The existence of this cavity-induced modulation may be indicative of the presence of a cavity in the presence of noise or clutter (other returned signals).

In some embodiments, object(s) maybe illuminated by an electromagnetic signal at wavelengths short enough to enter into a cavity in the object. A cavity is a hollow place or a void or empty space within a solid body. Furthermore, a cavity as used in this disclosure may mean volumes of a material with one physical property contained in whole or in part in an object comprised of a material with physical properties sensibly different from the included volume. Furthermore, if the surface of the body is electrically conductive, then cavities as used in this disclosure may mean indentations in the surface.

Unlike simpler reflecting surfaces, at least two different electromagnetic wavelengths interacting with a cavity may reradiate signals whose amplitudes have been modified by the presence of the cavity along a single angle from the cavity. The amplitude may be measured by a signal's power. This interaction phenomenon may cause the electromagnetic wave to be reradiated differentially in amplitude at different frequencies. Reradiated as used here may be used interchangeably with the term "reflected" depending on the manner in which the reader understands the interaction of electromagnetic waves with materials. Alternatively, the interaction phenomenon may cause reradiated signals at a single frequency to be reradiated differentially in amplitude at different angles from the cavity. This differential radiation at different frequencies may express itself at a single angle of illumination and reradiation or as a spatially amplitude modulated pattern, the radar cross section, at a single frequency. The two phenomena being the Fourier transform of one another.

Figure 1:
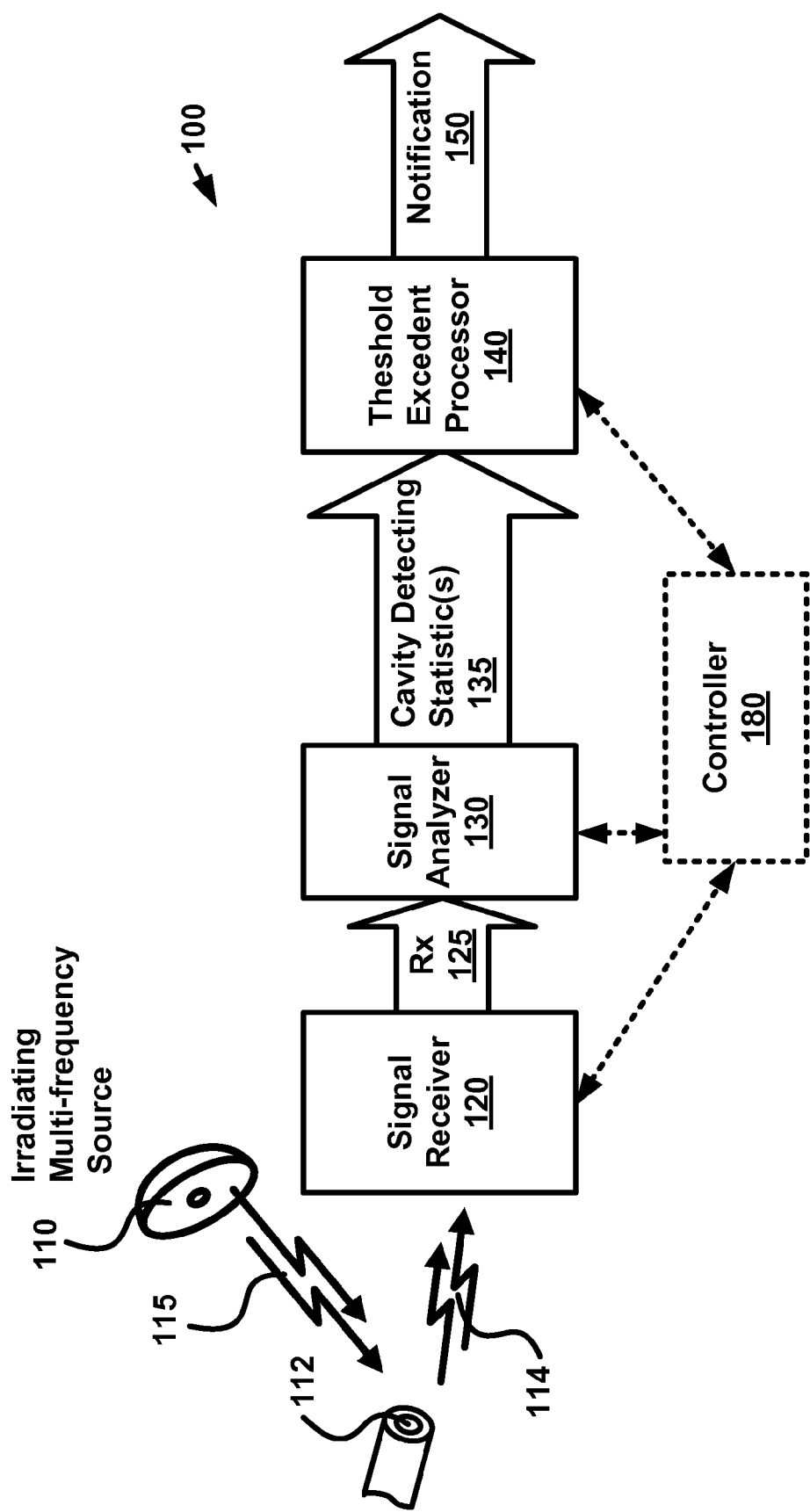
FIG. 1 is a block diagram of an example cavity detection device as per an aspect of an embodiment of the present invention.

Example FIG. 1 is a block diagram of an apparatus 100 configured to detect cavities. Embodiment 100 includes a signal receiver 120, a signal analyzer 130 and a threshold excedent determination processor 140. Additionally, in some embodiments, a controller 180 may be employed to coordinate the operation of the signal receiver 120, the signal analyzer 130 and the threshold excedent determination processor 140.

The signal receiver 120 may be configured to receive reflected signal 114. Reflected signal 114 may result from an interaction of irradiating electromagnetic signal 115 with a cavity 112. The effect of this interaction may cause reradiated energy 114 at different frequencies to be at different amplitudes.

According to embodiments, the irradiating signal(s) 115 may include multiple frequency components. In some embodiments, the irradiating signal(s) 115 may simultaneously include a multitude of frequency components. The multitude of frequency components may be above a cavity dependent cutoff frequency. At least some of the frequency components may be temporal in that they may be irradiated at different times. Alternatively, at least some of the frequency components may be combined.

Irradiating signal(s) 115 may include electromagnetic signal(s), acoustic signal(s), propagating fields, or the like. In some embodiments, the irradiating signal(s) 115 may include a randomized spectral component. In other words, the irradiating signal 115 may not need to include a predetermined waveform. In yet another embodiment, the irradiating signal 115 may include a spread spectrum irradiating signal.

The irradiating signal(s) 115 may be generated by at least one irradiating multi-frequency source 110. Irradiating signal(s) may be generated using non co-located radiators. These non co-located radiators may be located spatially distinct from the signal receiver 120. The irradiating signal(s) 115 may be generated by non-cooperating multi-frequency sources such as commercial broadcast signals, radars, or other serendipitous (perhaps there is a better word) sources of radiating fields.

The reradiated energy 114 may be received by antenna(s) (not shown) and then directed to signal receiver 120 as received reflected signal 125. In some embodiments, the signal receiver 120 may be tunable to at least two frequencies. The signal receiver 120 may direct the reflected signal 114 to signal analyzer 130.

According to some embodiments of the present invention, the signal analyzer 130 may be configured to compute a cavity detecting statistic 135 of the received reflected signal 125. Optionally, the signal analyzer 130 may compare the relative values of the received reradiated signals 125 with a set of known values for the determination of more specific information about the cavity such as weapon type or cavity depth. The cavity detecting statistics 135 computed by the signal analyzer 130 may be transferred to a threshold excedent processor 140 that outputs a notification 150 when the signal from the signal analyzer exceeds a predetermined or adaptively determined threshold.

The signal analyzer 130 may be as simple as computing the average received power in defined frequency bands and determining the amount by which the power in each frequency band exceeds this average. This is analogous to an anomaly detector which determines when the statistics of the signals in the multiplicity of bands deviates from a norm. The norm may be some measure other than the simple average and may consist of parametric estimation of the type of power distribution as well as its simple statistics. It may also take into account non-uniform powers (effective radiated power) and propagation losses at different frequencies of the irradiating signal(s) 115.

Figure 2:
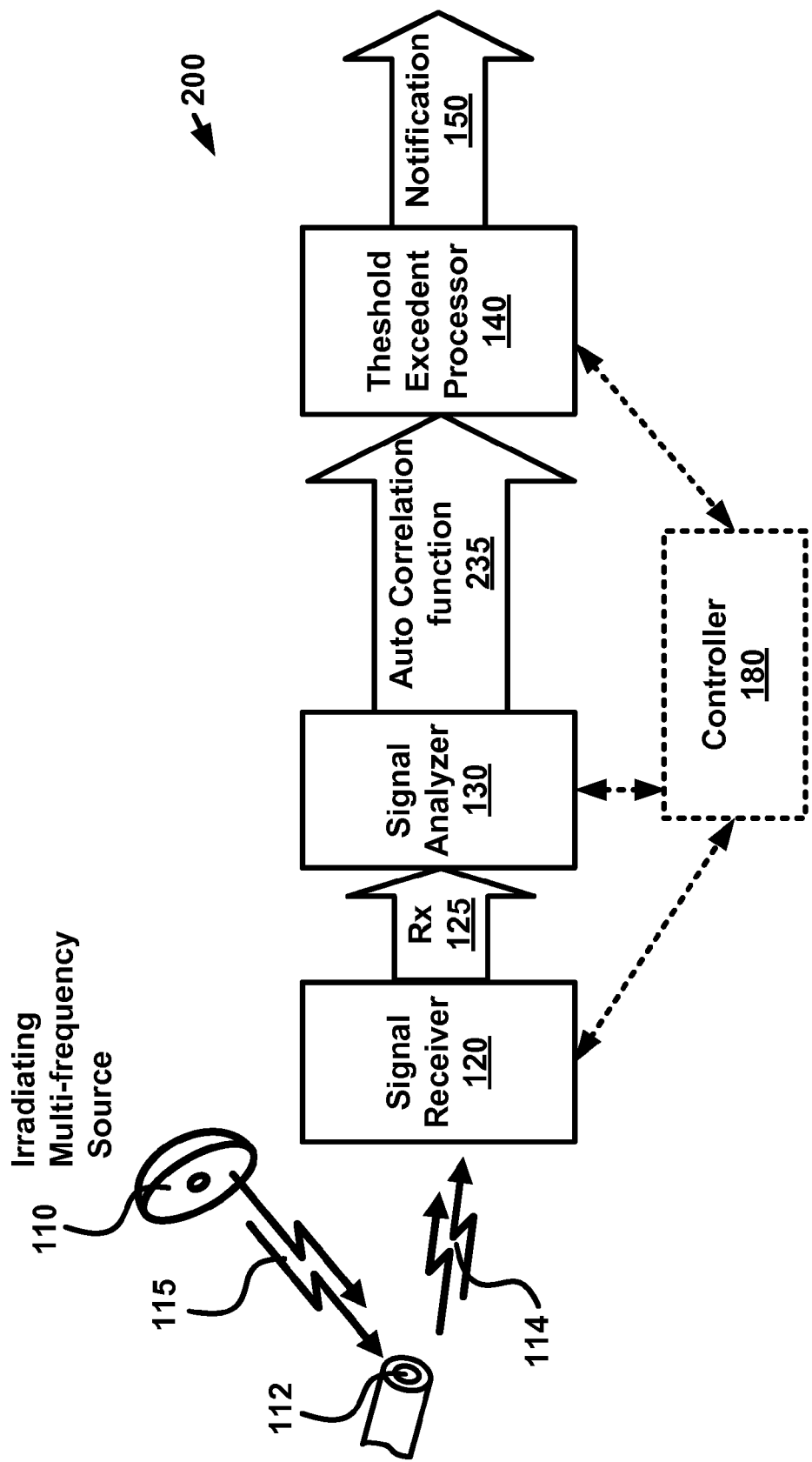
FIG. 2 is a block diagram of an example cavity detection device that uses an autocorrelation function (ACF) as per an aspect of an embodiment of the present invention.

Example FIG. 2 is a block diagram of an embodiment of an apparatus 200, wherein the cavity detecting statistic(s) 135 of FIG. 1 is an autocorrelation function 235. Auto correlation function 235 may be determined in many ways including taking the Fourier transform of the power spectral density (PSD) of the received reflected signal 125. Autocorrelation is the cross-correlation of a signal with itself. Informally, autocorrelation may be the similarity between observations as a function of the time separation between them. It is a mathematical tool for finding repeating patterns, such as the presence of a periodic signal that has been hidden by noise, or identifying the missing fundamental frequency in a signal implied by its harmonic frequencies.

One skilled in the art will recognize that other statistics may also be used. While the mathematical interpretation of the Fourier Transform is the autocorrelation function, it may just as easily be understood to be the spectrum of the PSD. As such, a particular cavity, such as the bore of a particular sniper rifle, may exhibit a unique, characteristic PSD modulating signal. In this case, the presence of that particular modulating frequency would be a cavity detecting statistic. An example of where the Fourier Transform is not used is to observe the frequencies at which the amplitude modulation of the PSD peaks. Since the frequencies at which these peaks occur may be related to the number of wavelengths in the cavity, the length of the cavity (as determined by an analytical computation of the only cavity length which can produce that exact integer relationship of resonant frequencies) may be used to determine the length of the cavity. Hence, this may be a cavity detecting statistic which may also be able to provide internal measurements suitable for cavity identification and differentiation from other cavities which are not of interest. Yet another cavity detecting statistic may be the ratio of the powers of two predetermined received reradiated frequencies.

According to some embodiments of the present invention, the threshold excedent determination processor 140 may be configured to generate a notification 150 when the cavity detecting statistic 135 (e.g. an autocorrelation function 135) exceeds a value. The threshold may include at least one value. The value may be predetermined or dynamically determined. Dynamically determined threshold(s) may be based on at least one of the cavity detecting statistic(s) 135. The threshold may also include a multi-variable function. James & James, *Mathematics Dictionary*, 1966 defines: "A function of one variable is a function which has only one independent variable." "A function of several variables [multi-variable] is a function which takes on a value or values corresponding to every set of values of several variables (called the independent variables)."

The predetermined value may be a factor multiplied by cavity detecting statistic(s) 135. In some embodiments of the present invention, notification 150 may be a positive indication of a cavity detection.

The signal analyzer 130 may be more complex. For example, the signal analyzer 130 may calculate the Fourier transform of the power spectral density. Mathematically, the Fourier transform of the power spectral density (PSD) is the autocorrelation of the signal from which the PSD was formed. The modulation of the PSD and the autocorrelation function of the originating function are isomorphic to each other and either of them can be used to effectively compute a confidence value that is then passed to a threshold excedent processor 140 module.

The threshold excedent processor 140 may determine whether the confidence value produced by the signal analyzer 130 has exceeded a predetermined threshold value. This threshold value can be a fixed value or can be dynamically altered based on the statistics produced by the signal analyzer. For example, the threshold associated with a Gaussian distribution of power in the PSD may call for a higher threshold value than one that is associated with a Rayleigh or other statistical distribution of the non-cavity received signals. The PSD may have different distributions based on the type of noise and/or the type of clutter which is received by the frequency selective receiver.

Figure 3:
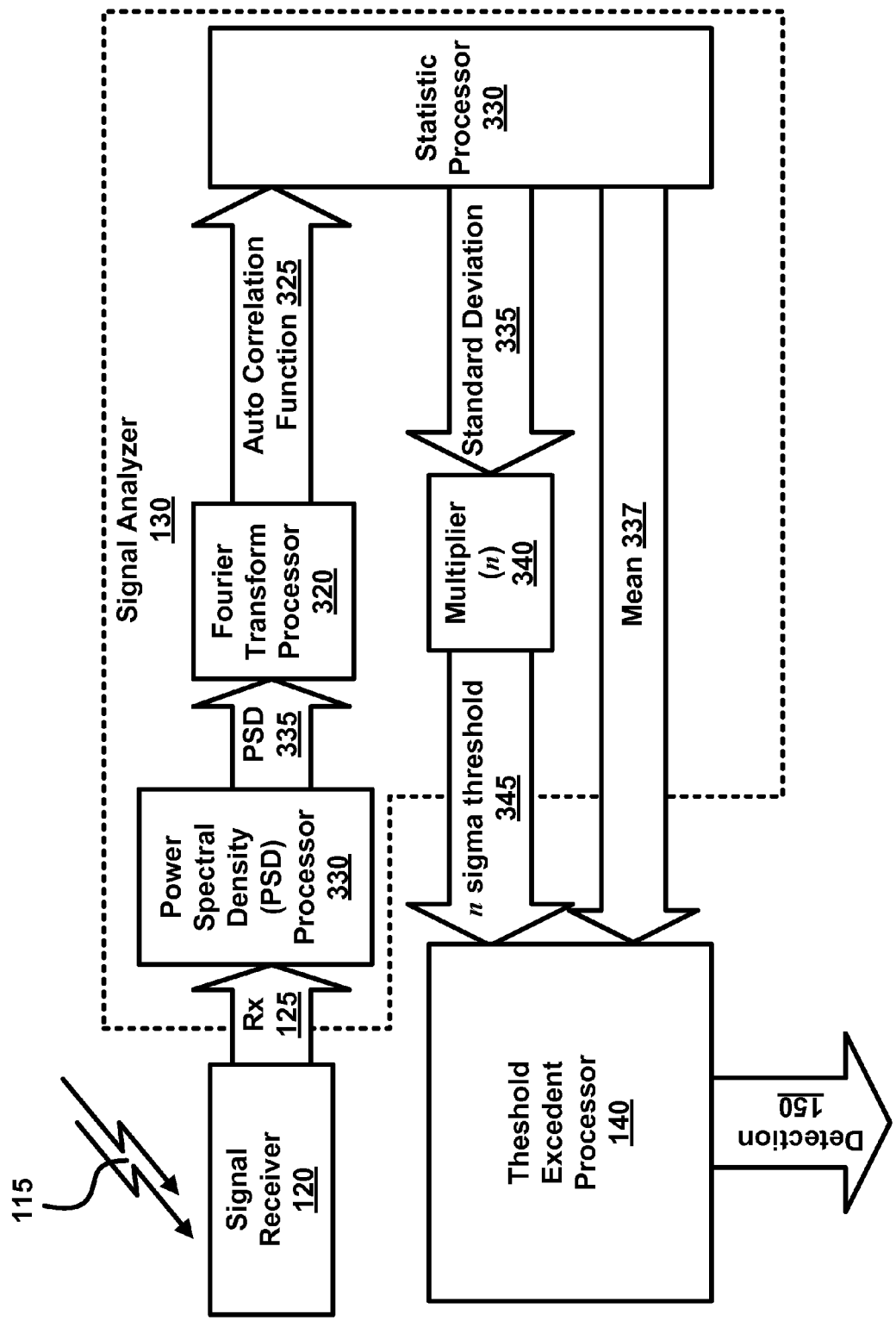
FIG. 3 is a block diagram of an example cavity detection device with an expanded signal processor block as per an aspect of an embodiment of the present invention.

FIG. 3 is a block diagram of an example cavity detection device with an expanded signal processor block as per an aspect of an embodiment of the present invention. In this example embodiment, a power spectral density processor 330 calculates a power spectral density (PSD) 335 from received signal 125. The PSD is a computation of the received reradiated signal's power as a function of the wavelength or frequency.

The terms wavelength and frequency are used interchangeably herein as it is well known that the velocity of a signal in a propagating medium is equal to the frequency of the signal multiplied by the wavelength of the signal in that medium.

A Fourier transform processor 320 may compute an autocorrelation function 325 of the reradiated signal 125 by taking the Fourier transform of the PSD 335. In alternative embodiments of the present invention, computation of the ACF could be replaced by a direct computation of the ACF without the intermediate steps of the PSD and its Fourier transform.

Statistic Processor 330 may determine additional statistics from the amplitude of the ACF 325 such as a mean 337 and standard deviation 335. Other statistics may also be determined to be useful. As shown in this example, the standard deviation 335 may be multiplied by some factor n by a multiplier 340 to generate an n sigma threshold 345. One skilled in the art will recognize that other fixed value(s) or one which is computed based on a statistic of the received reradiated signal 125 may be used. When the ACF value at one or more frequencies exceeds a predefined or adaptive amplitude value(s) it is said to have exceeded a threshold or be a threshold excedent. When a threshold is exceeded, a notification 150 to that effect is made available for purposes external to the present embodiment. This notification may be called a detection 150. In this embodiment, threshold excedent processor 140 generates detection notification 150 when mean 337 is determined to have exceeded the n sigma threshold 345.

It can readily be seen by one skilled in the art that there are a large number of different statistics that may be computed on the reradiated signal to determine whether a cavity 112 exists. These statistics may be based on the inherent result of the illumination of a cavity with more than one frequency. This irradiating signal 115 may not need to be of any particular form to recognize different cavities 112 as long as the reflected signal 114 has two or more frequency components so that cavity detecting statistics can be computed.

Alternatively, if there is angular motion of the cavity relative to the reflected signal, there may also be an amplitude modulation which is induced by the cavity. This phenomenon may be seen with a signal that includes one or more than one frequency component.

Figure 4:
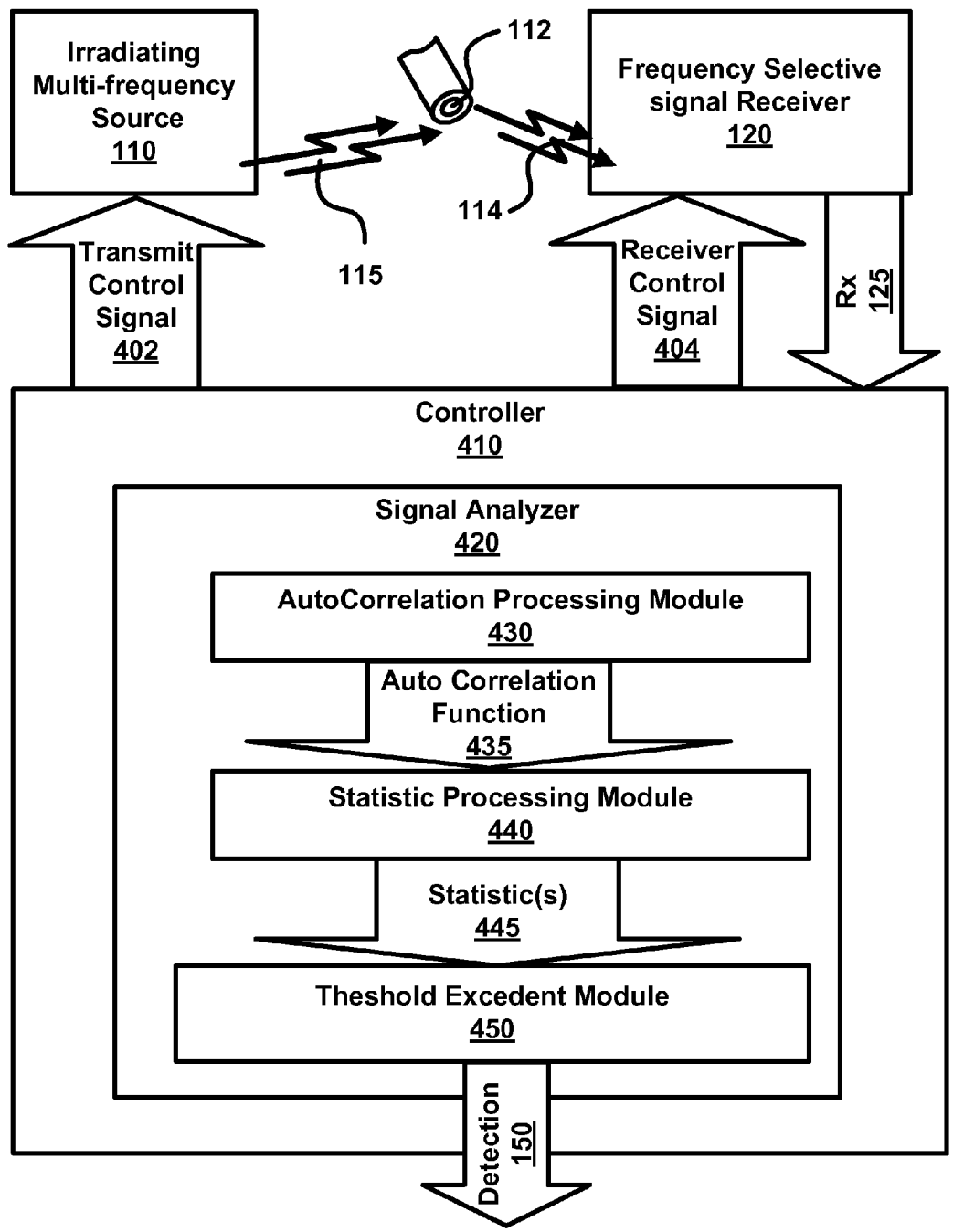
FIG. 4 is a block diagram of an example cavity detection device configured to use a controller as per an aspect of an embodiment of the present invention.

FIG. 4 is a block diagram of an example cavity detection device 400 configured to use a controller as per an aspect of an embodiment of the present invention. This embodiment shows the use of a controller 410. Controller 410 may be a special purpose hardware device configured to detect a cavity. As shown in FIG. 4, controller 410 may control transmit control signal 402 and receiver control signal 404. Transmit control signal 402 controls your radiating multi-frequency source 110. Example controls may direct your radiating multi frequency source 110 when to radiate, when not to radiate, what frequencies to radiate at, what powers to radiate at, or the like. Like our previous examples, irradiating signal 115 may interact with cavity 112. The result of this interaction may result in signal 114. Frequency selective signal receiver may receive this reflected signal 114. Receiver control signal 404 may control frequency selective signal receiver 120. Example controls may include received times, received frequencies, filtering, or the like. The output of the frequency selective signal receiver 120 may be forwarded to controller 410 for further processing. Controller 410 may use hardware, software or a combination thereof to process received signal 125.

Signal analyzer 420 may include a series of modules including: autocorrelation processing module 430, statistics processing module 440, and threshold exceeded module 450. Autocorrelation processing module 430 generates an autocorrelation function 435 from the received signal 125 as described earlier. Statistics processing module 440 analyzes autocorrelation function 435 to determine statistics 445 that may be useful in detecting cavities 112. The threshold excedent module 450 determines when statistics 445 exceeds a threshold indicative of a cavity. A positive threshold exceedance should cause threshold module 450 to generate detection 150.

Figure 5:
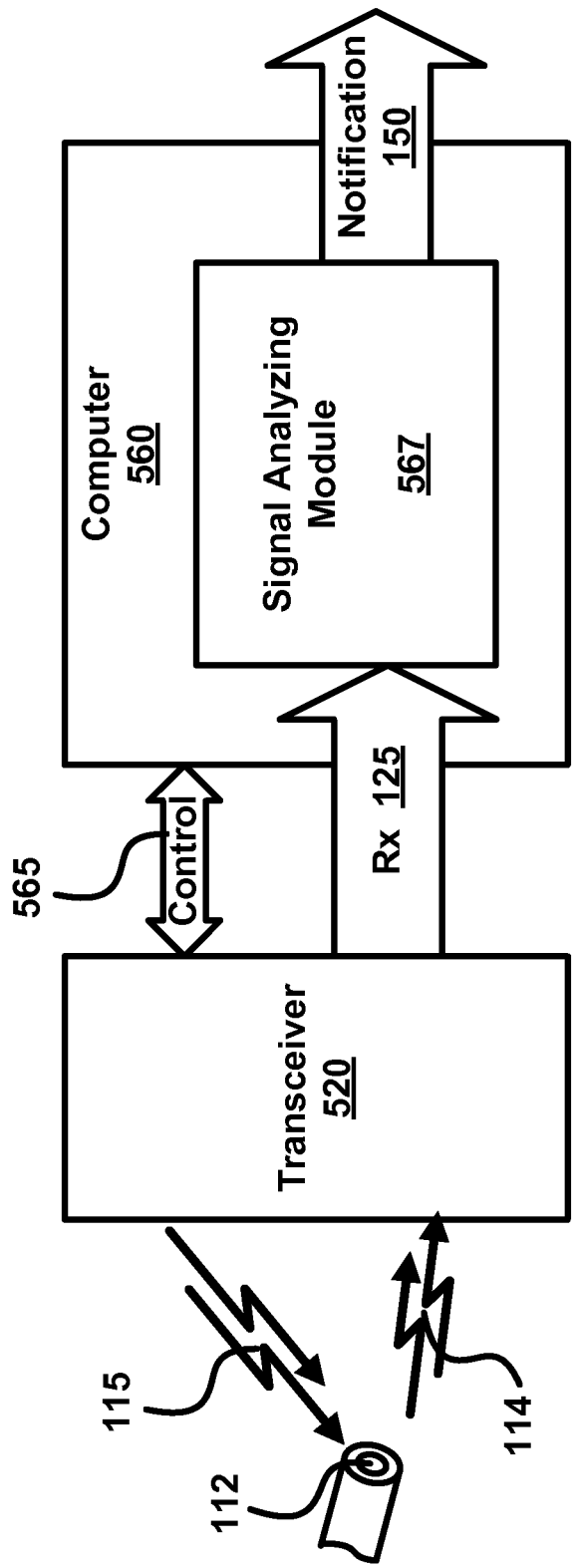
FIG. 5 is a block diagram of an example cavity detection device configured to use a computer as per an aspect of an embodiment of the present invention.

FIG. 5 is a block diagram of an example cavity detection device 500 configured to use a computer as per an aspect of an embodiment of the present invention. Some embodiments of the present invention may utilize a computer 560 to perform the signal processing required to detect a cavity from received signal 125. Computer 560 may be a general purpose computer configured to be able to receive signal 125 and control a transceiver 520 using control signal 565. The received signal 125 may be received using a standard computer port such as a USB port, a serial port, a parallel port, wireless communications, or the like. Similarly, control signals 565 may also be transmitted and/or received using a standard computer port. Computer 560 may also be configured to use specialized hardware to perform these interface functions. Transceiver 520 may be a radar device. For example, transceiver 520 may be any type of transceiver capable of generating an irradiation signal 115 and receiving a received reflected signal 125.

Signal analyzing module 567 may be a hardware module, a software module and/or a combination thereof. One embodiment may include running a software module developed using a mathematical, scientific or engineering computation program such as Matlab or the like. In other embodiments, the software module may actually be an operational version of the mathematical simulation program. Yet other embodiments may utilize a combination of a mathematical simulation program in combination with hardware acceleration modules.

Figure 6:
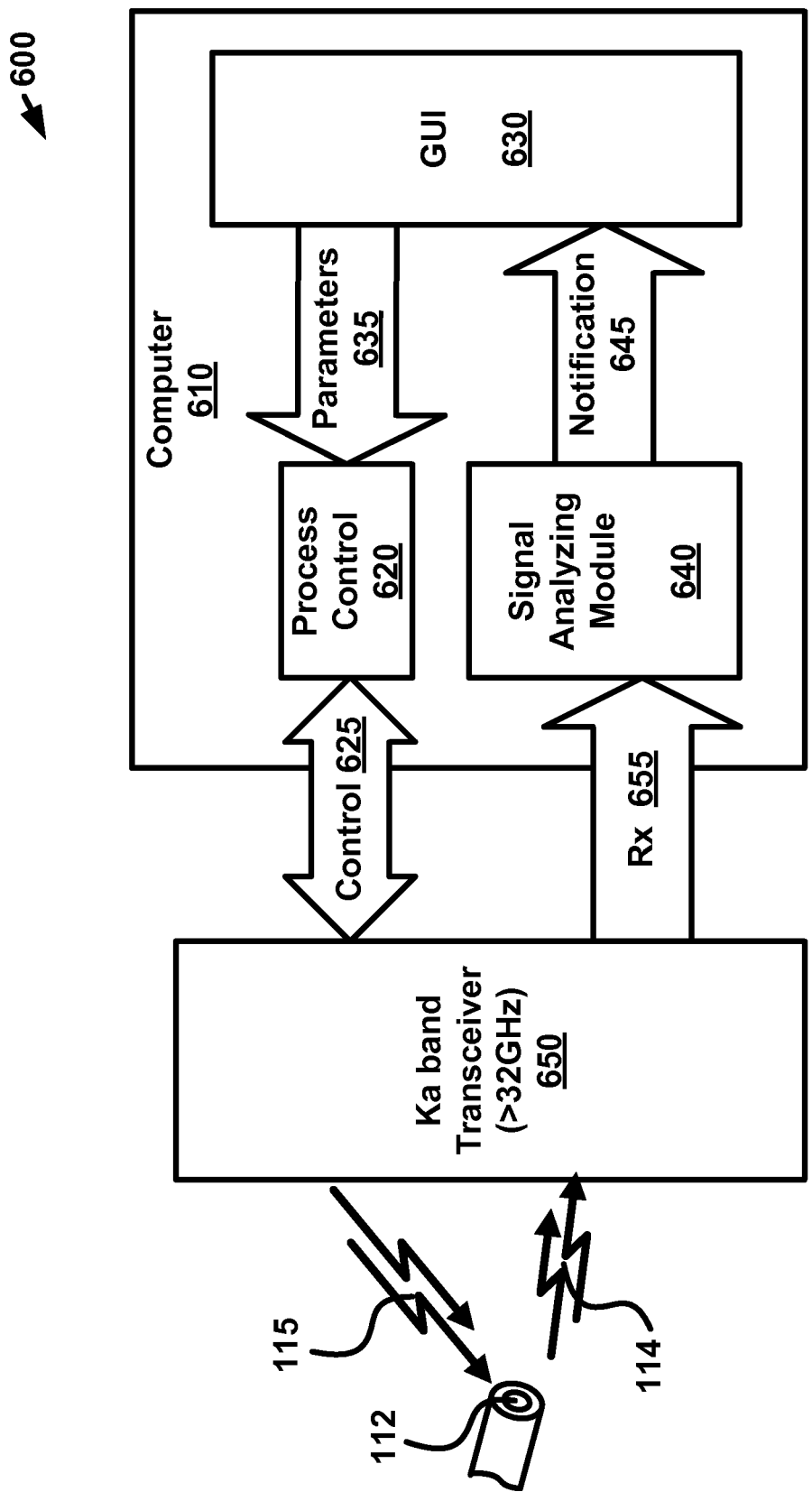
FIG. 6 is a block diagram of an example cavity detection device configured to use a computer as per an aspect of an embodiment of the present invention.

FIG. 6 is a block diagram of another example cavity detection device 600 configured to use a computer 610 as per an aspect of an embodiment of the present invention. As illustrated, computer 610 interfaces with a Ka band transceiver 650 using uni-directinal or multi-directional control signals 625 through process control 620. Received signal 655 is received from transceiver 650 by signal analyzing module 640. Computer 610 provides hardware to transmit and receive the signals 625 and 655. Received signal 655 may be digital and/or analog. In the case where signal 655 is analog, computer 610 may need specialized receive hardware. A graphical user interface (GUI) 630 may run on computer 610 as an interface to a user. GUI 630 may allow the user to specify parameters 635 either directly or indirectly. Indirect specification of parameters 635 may be through the manipulation of a graphical representation (or the like) that has meaning to a users and is capable of being converted into an explicit parameter. These parameters 635 may be interpreted by process control 620 control transceiver 650. Signal analyzing module 640 may process received signal 655 as described earlier to generate notification 645. This notification 645 may be presented to user through GUI 630 either directly or indirectly. The GUI may also contain audio or other perceivable components.

As shown, transceiver 650 operates in the Ka frequency band. This band may be useful because of its wavelength and the availability of low-cost components used in commercial radar devices such as police radar guns. However, one skilled in the art will recognize that other transceivers utilizing other frequency bands may be used as long as they exhibit signal characteristics described herein.

Figure 7:
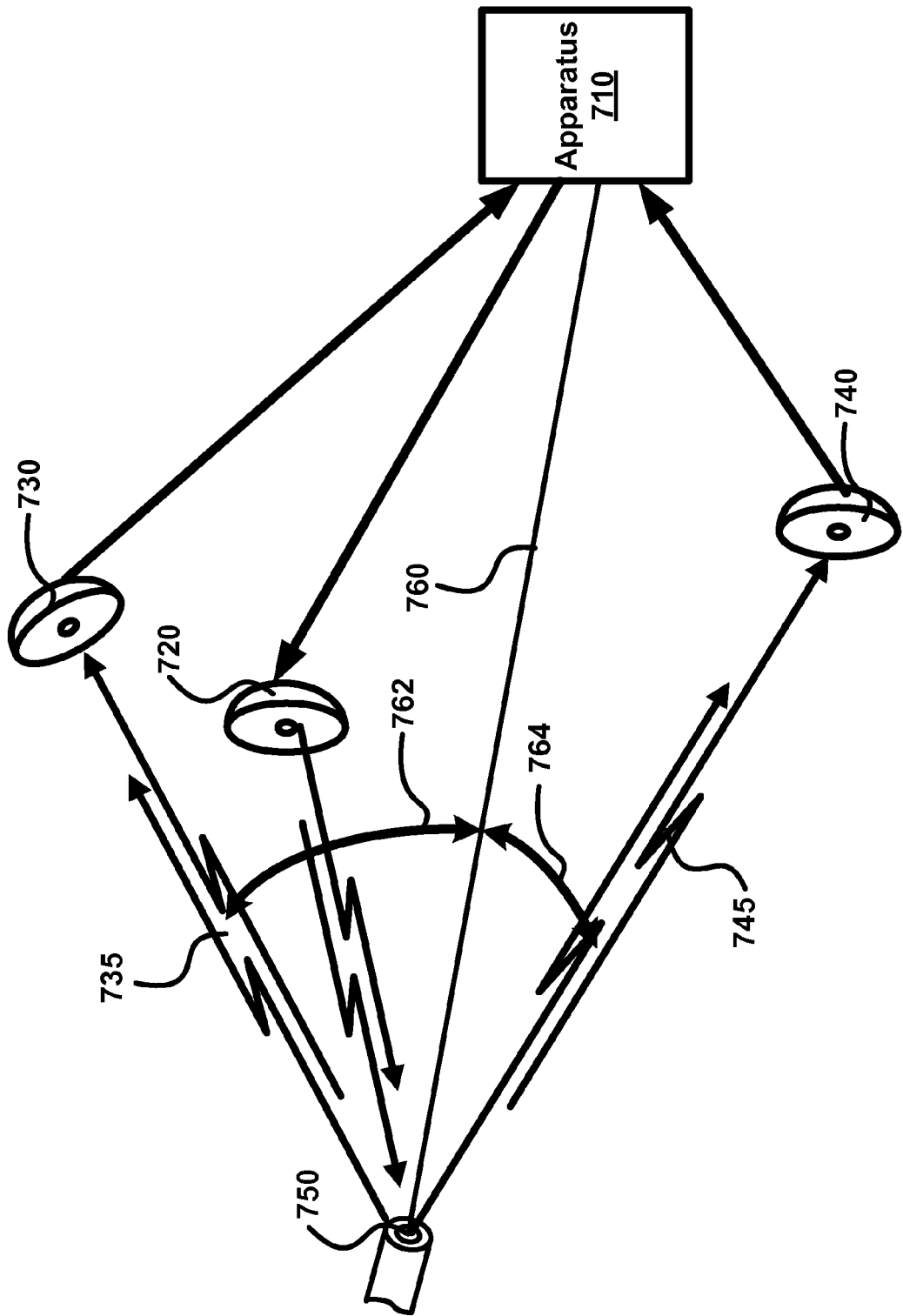
FIG. 7 is a diagram illustrating an example configuration that uses multiple receivers and associated geometry to determine the location of the cavity as per an aspect of an embodiment of the present invention.

In some embodiments of the invention, the apparatus may be configured to detect and locate a sniper rifle. In these types of embodiments, the cavity may be a firearm bore. FIG. 7 is a block diagram showing how embodiment(s) of the present invention may be used to locate a cavity such as a sniper rifle. As illustrated in this example, multiple reception antennas (730 and 740) may be located at known positions relative to apparatus 710. Irradiation source(s) such as irradiation source 720 intersects with cavity 750 producing reflected signal 735. Reflected signal 735 may then be received by multiple reception antennas (730 and 740). The signal strength and other measurements such as cavity detecting statistics may be utilized to determine the angle 762 and 764 from the line between the cavity 750 and the apparatus 710. Angles 762 and 764 may be used to determine the azimuth bearing from the cavity 750 to the apparatus 710, and/or the elevation bearing from the cavity 750 to the apparatus 710.

Receiving antenna(s) (e.g. 730 and/or 740 etc.) may be either direction or omnidirectional as the determination of whether there is a cavity reradiating energy is determined by the modulation induced on the reradiated signal by the configuration of the cavity as well as the angle of the receiving antenna off the boresight of the cavity. For a specific cavity 750, the frequency at which the peak amplitudes occurs may be different with angle off-boresight. This characteristic may also be used to determine the direction that a cavity 750 is pointing. These components of directional statistics may be used to guide a projectile to a detected cavity. Similarly, cavity detecting statistic(s) may be used to aim a weapon in the direction of a detected cavity.

Figure 8:
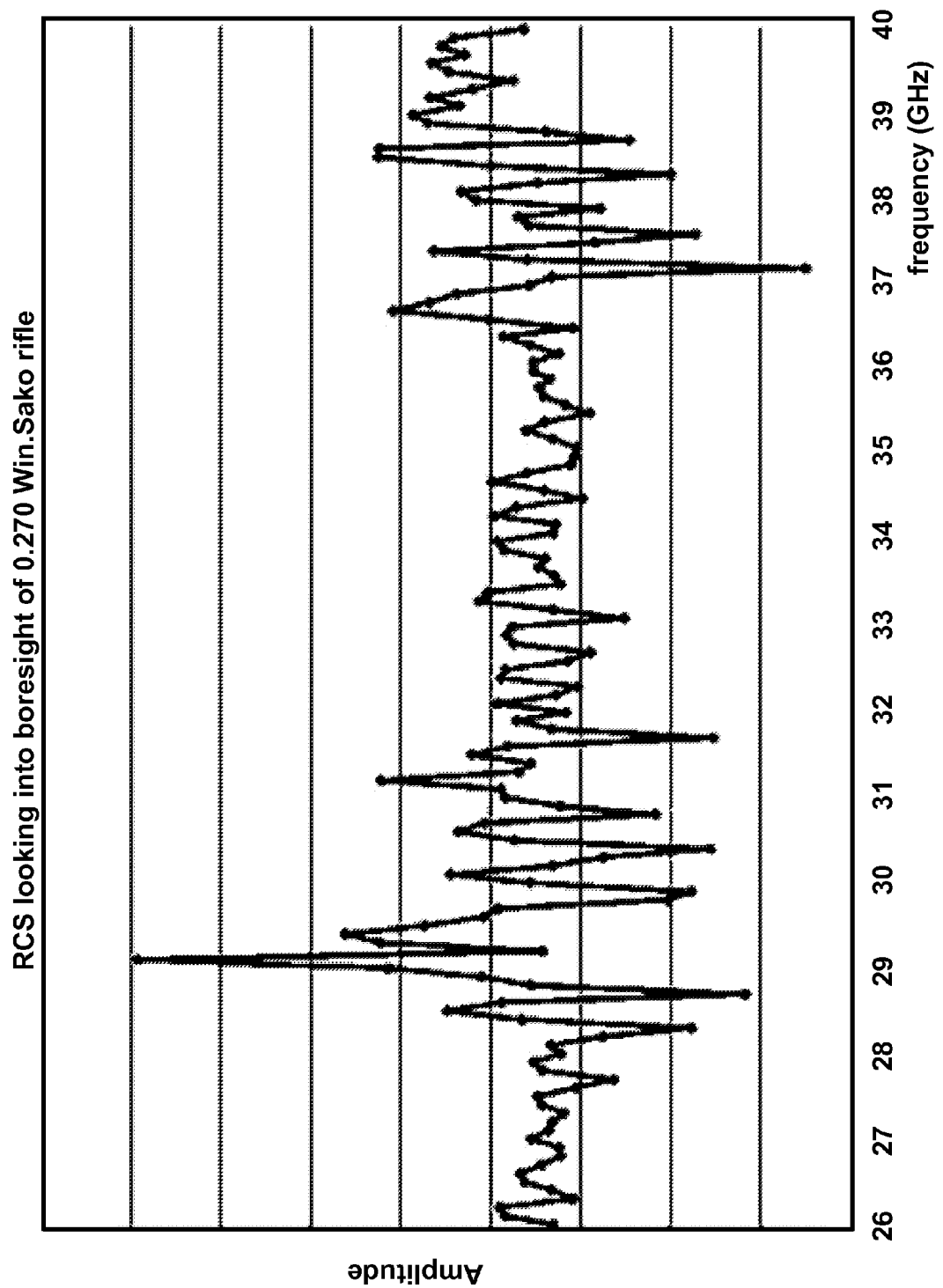
FIG. 8 is a plot of the amplitude response of a resonant cavity when illuminated over a range of frequencies from 26 GHz to 40 GHz.

FIG. 8 is a plot of the amplitude response of a resonance cavity when illuminated over a range of frequencies from 26 GHz to 40 GHz. Analysis of these measured values demonstrates the characteristic amplitudes at specific frequencies that the signal processing described herein detects. Specifically, this plot is the result of return signal measurements from the irradiation of a 0.270 Win. Sako rifle from 26 to 40 GHz. It may be shown from this data that the frequencies at which the maximum amplitude and minimum amplitude occur are related to whether there is an odd or even number of wavelengths down the barrel. The fact that these maximum and minimum values occur demonstrate that it is the internal cavity of the rifle bore which is causing the phenomenon rather than some external characteristic.

Another example embodiment consists of a device for detecting a cavity that includes a frequency selective electromagnetic wave receiver and a threshold excedent determination module. The frequency selective electromagnetic wave receiver may be configured to receive a reradiating electromagnetic signal resulting from an internal resonant phenomenon occurring within said cavity. Various embodiments may use different signal receivers that are compatible with the signal processing methodology used. For example, the signal receiver may be a frequency selective signal receiver configured to be used in temporally determining frequency specific signal statistics. According to some embodiments, the frequency selective signal receiver may be configured to sweep continuously or discretely step over a prescribed bandwidth and receive wavelengths which have illuminated and been reradiated by a cavity. A frequency selective signal receiver is a receiver that can distinguish between a signal received at different frequencies. As a second example, the signal receiver may be a wider band signal receiver configured to be used in simultaneously determining signal statistics.

Another embodiment of the irradiating signal is to utilize an irradiating signal which contains multiple frequencies in a single transmitted waveform such as a chirp signal. The necessary PSD can be derived from the reception and extraction of individual frequency components from the chirp signal. Additionally, an irradiating signal may include random pseudo-random or deterministic frequency components transmitted in a random, pseudo-random, or deterministic order.

Usable wavelengths for irradiating the cavity may be at least those wavelengths which are above the waveguide cutoff frequency, the calculation of which may depend on the electromagnetic modes in the cavity and whether the cavity is circular or rectangular in cross section or simply symmetric in shape, as well as the polarization of the irradiating and received signals (e.g., HH, HV, VV, VH, or RH or LH circular or combinations thereof). The sweep bandwidth of this frequency selective signal receiver may need to be wide enough to allow at least one complete cycle of amplitude modulation resulting from the cavity induced modulation.

The output of the receiver may be transferred to a signal analyzer which computes statistics of the reradiated signal. A statistic is, in its most general form, a numerical computation on a set of numbers. The threshold excedent determination module may be configured to generate a notification when the received reradiating signal exceeds a threshold.

In an alternative embodiment, material properties of the cavity itself may change the characteristics of the reradiated energy. Such properties include the internal surface of the cavity and whether it is made of electrically conductive, partially-conductive, or non-conductive material. In combination with or in addition to the material comprising the internal surface of the cavity, the walls of the material may be made of a material which is dielectrically or acoustically distinct from the material in the cavity.

In an alternative embodiment based on acoustic signals, the material in the cavity having physically distinct properties from the material containing the cavity may cause interactions with the irradiating acoustic signal similar in character to the electromagnetic signal. The similarity is the frequency dependent reradiation of power that may be detected by a signal receiver with cavity detecting statistics being computed in a signal analyzer. The determination of whether a cavity is present may be based on whether the cavity detecting statistic exceeds a threshold.

Alternative embodiments may be configured to respond to cavities of different geometries. These geometries can include symmetrical cross sections. Symmetrical cross sections can be either circularly symmetric or simply symmetric about one or more axes.

In another preferred embodiment, the apparatus is configured to transmit electromagnetic waves at a the bore of a rifle or other weapon which is a cavity which interacts with the irradiating electromagnetic waves to alter their amplitude. The cavity induced amplitude modulation of the reradiated electromagnetic signals as a function of the exciting electromagnetic wavelengths allows one through the use of frequency selective thresholding to determine the presence of a rifle.

In this specification, "a" and "an" and similar phrases are to be interpreted as "at least one" and "one or more."

Many of the elements described in the disclosed embodiments may be implemented as modules. A module is defined here as an isolatable element that performs a defined function and has a defined interface to other elements. The modules described in this disclosure may be implemented in hardware, a combination of hardware and software, firmware, wetware (i.e, hardware with a biological element) or a combination thereof, all of which are behaviorally equivalent. For example, modules may be implemented as a software routine written in a computer programming language (such as C, C++, Fortran, Java, Basic, Matlab, or the like) or a modeling/simulation program such as Simulink, Stateflow, GNU Octave, or LabVIEW MathScript. Additionally, it may be possible to implement modules using physical hardware that incorporates discrete or programmable analog, digital and/or quantum hardware. Examples of programmable hardware include: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described example embodiments. For example, the irradiating signal can be any type of propagating wave and could be electromagnetic or acoustic. The cavity can be open or closed and, depending on the type of irradiating signal, can be made of electrically conductive or non-conductive material or coatings.

In addition, it should be understood that any figures which highlight the functionality and advantages, are presented for example purposes only. The disclosed architecture is sufficiently flexible and configurable, such that it may be utilized in ways other than that shown. For example, the steps listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

What is claimed is:

1. An apparatus comprising:
 a) a frequency selective electromagnetic receiver configured to receive a reradiating electromagnetic signal resulting from a cavity induced modulation phenomenon occurring within at least one cavity; and
 b) a signal analyzing module configured to:
  i) determine a power spectral density of the reradiating electromagnetic signal;

ii) observe frequencies at which the amplitude modulation of the power spectral density peaks; and
  iii) determine a cavity length employing an integer relationship of the frequencies of the power spectral density peaks.

2. The apparatus according to claim 1, wherein the signal analyzing module is further configured to:
  a) compute at least one cavity detecting statistic of the reradiating electromagnetic signal; and
  b) generate a notification when the at least one cavity detecting statistic exceeds a threshold.

3. The apparatus according to claim 1, wherein the signal analyzing module is further configured to generate a value corresponding to the cavity length.

4. The apparatus according to claim 1, wherein the cavity induced modulation phenomenon results from an interaction of at least one irradiating signal with the at least one cavity, said at least one irradiating signal including at least two frequency components.

5. The apparatus according to claim 2, wherein the threshold includes a multi-variable function.

6. The apparatus according to claim 2, wherein the threshold includes at least one value.

7. The apparatus according to claim 2, wherein at least one of the at least one cavity detecting statistic is an autocorrelation function.

8. The apparatus according to claim 7, wherein the autocorrelation function is a Fourier transform of the power spectral density of the reradiating electromagnetic signal.

9. The apparatus according to claim 1, wherein the frequency selective electromagnetic receiver is further configured to receive the reradiating electromagnetic signal comprising a randomized spectral component.

10. The apparatus according to claim 1, wherein the frequency selective electromagnetic receiver is further configured to receive the reradiating electromagnetic signal resulting from a spread spectrum irradiating signal.

11. The apparatus according to claim 1, wherein the frequency selective electromagnetic receiver is further configured to receive the reradiating electromagnetic signal radiated from at least two non co-located radiators.

12. The apparatus according to claim 1, wherein the frequency selective electromagnetic receiver is further configured to receive at least one irradiating signal radiated from a location spatially distinct from the signal receiver.

13. The apparatus according to claim 1, wherein the frequency selective electromagnetic receiver is further configured to receive at least one reradiating electromagnetic signal above a cavity dependent cutoff frequency.

14. The apparatus according to claim 1, wherein the cavity is a weapon bore.

15. The apparatus according to claim 1, wherein the apparatus is further configured to determine at least one of the following:
  a) an azimuth bearing from the cavity to the apparatus;
  b) an elevation bearing from the cavity to the apparatus; and
  c) a combination of the above.

16. The apparatus according to claim 1, wherein the frequency selective electromagnetic receiver is configured to simultaneously receive at least two selected frequencies.

17. The apparatus according to claim 2, wherein the threshold is dynamically determined based on at least one of the at least one cavity detecting statistic.

18. The apparatus according to claim 2, wherein at least one of the at least one cavity detecting statistic is used to guide a projectile to the cavity.

19. The apparatus according to claim 2, wherein at least one of the at least one cavity detecting statistic is used to aim a weapon in the direction of the cavity.

20. The apparatus according to claim 1, wherein the signal analyzing module uses the cavity length to determine a weapon type.

* * * * *